(12) United States Patent
Migita

(10) Patent No.: US 11,954,927 B2
(45) Date of Patent: Apr. 9, 2024

(54) INFORMATION PROCESSING SYSTEM AND READING DEVICE FOR ACQUIRING TARGET CONTENT INFORMATION FROM RECORDING MEDIUM AND OUTPUTTING INFORMATION ABOUT ERRONEOUS RECORDING MEDIUM

(71) Applicant: FUJIFILM BUSINESS INNOVATION CORP., Tokyo (JP)

(72) Inventor: Yotaro Migita, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 484 days.

(21) Appl. No.: 17/142,346

(22) Filed: Jan. 6, 2021

(65) Prior Publication Data

US 2022/0058413 A1 Feb. 24, 2022

(30) Foreign Application Priority Data

Aug. 19, 2020 (JP) .................................. 2020-138901

(51) Int. Cl.
| | | |
|---|---|---|
| *G06V 30/12* | (2022.01) | |
| *G06V 10/98* | (2022.01) | |
| *G06V 30/14* | (2022.01) | |
| *G06V 30/416* | (2022.01) | |
| *H04N 1/387* | (2006.01) | |
| *H04W 4/029* | (2018.01) | |
| *H04N 1/00* | (2006.01) | |

(52) U.S. Cl.
CPC .......... *G06V 30/133* (2022.01); *G06V 10/987* (2022.01); *G06V 30/1456* (2022.01); *G06V 30/416* (2022.01); *H04N 1/3878* (2013.01); *H04W 4/029* (2018.02)

(58) Field of Classification Search
CPC ........... H04N 1/00005; H04N 1/00076; H04N 1/00244; H04N 1/00408; H04N 1/38; H04N 1/3873; H04N 1/393; H04N 1/00039; H04N 1/00074; H04N 1/00082; H04N 1/00092; H04N 1/00411; H04N 1/00421; H04N 1/00424; H04N 1/00474; H04N 1/00477; H04N 2201/0094
USPC ............................... 358/1.11–1.18, 400–405
See application file for complete search history.

(56) References Cited

U.S. PATENT DOCUMENTS

| | | |
|---|---|---|
| 10,091,396 B2 | 10/2018 | Hattori et al. |
| 10,582,071 B2 | 3/2020 | Kobayashi |
| (Continued) | | |

FOREIGN PATENT DOCUMENTS

| | | |
|---|---|---|
| JP | 2018-116536 A | 7/2018 |
| JP | 2019-145981 A | 8/2019 |

*Primary Examiner* — Chad Dickerson
(74) *Attorney, Agent, or Firm* — Oliff PLC

(57) ABSTRACT

An information processing system includes a processor configured to: make an attempt to acquire, from recording medium images obtained by reading a plurality of recording media, target content information recorded on each of the plurality of recording media; and among the plurality of recording media, output information about an erroneous recording medium, the erroneous recording medium being (a) a recording medium of which the attempted acquisition of the target content information has been unsuccessful or (b) a recording medium of which the target content information acquired by the attempted acquisition does not satisfy a predetermined condition.

16 Claims, 10 Drawing Sheets

(56) References Cited

U.S. PATENT DOCUMENTS

2018/0205851 A1* 7/2018 Hattori .................... H04N 1/34
2019/0260885 A1* 8/2019 Kobayashi ......... H04N 1/00801
2020/0382661 A1* 12/2020 Ito ..................... H04N 1/00005

* cited by examiner

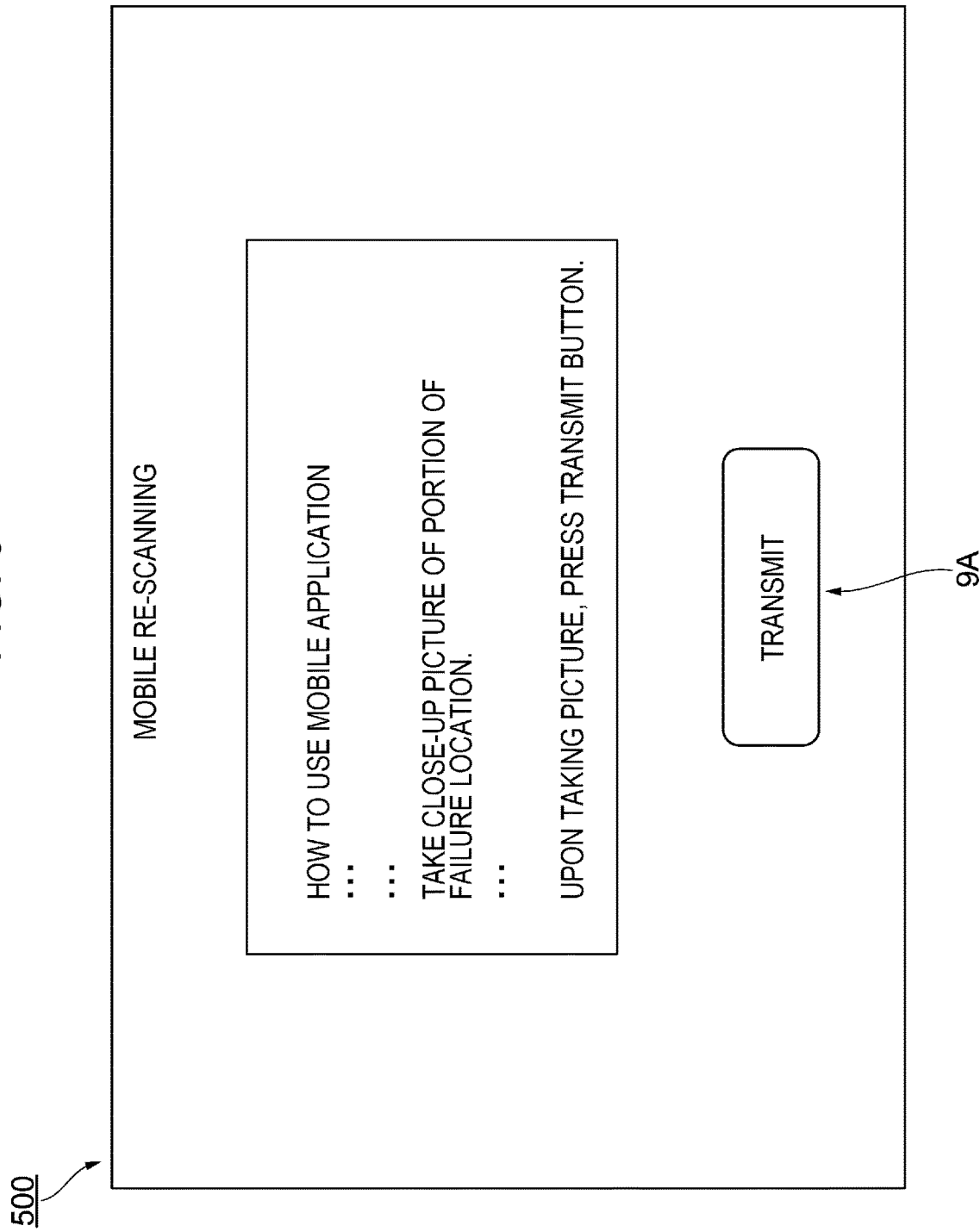

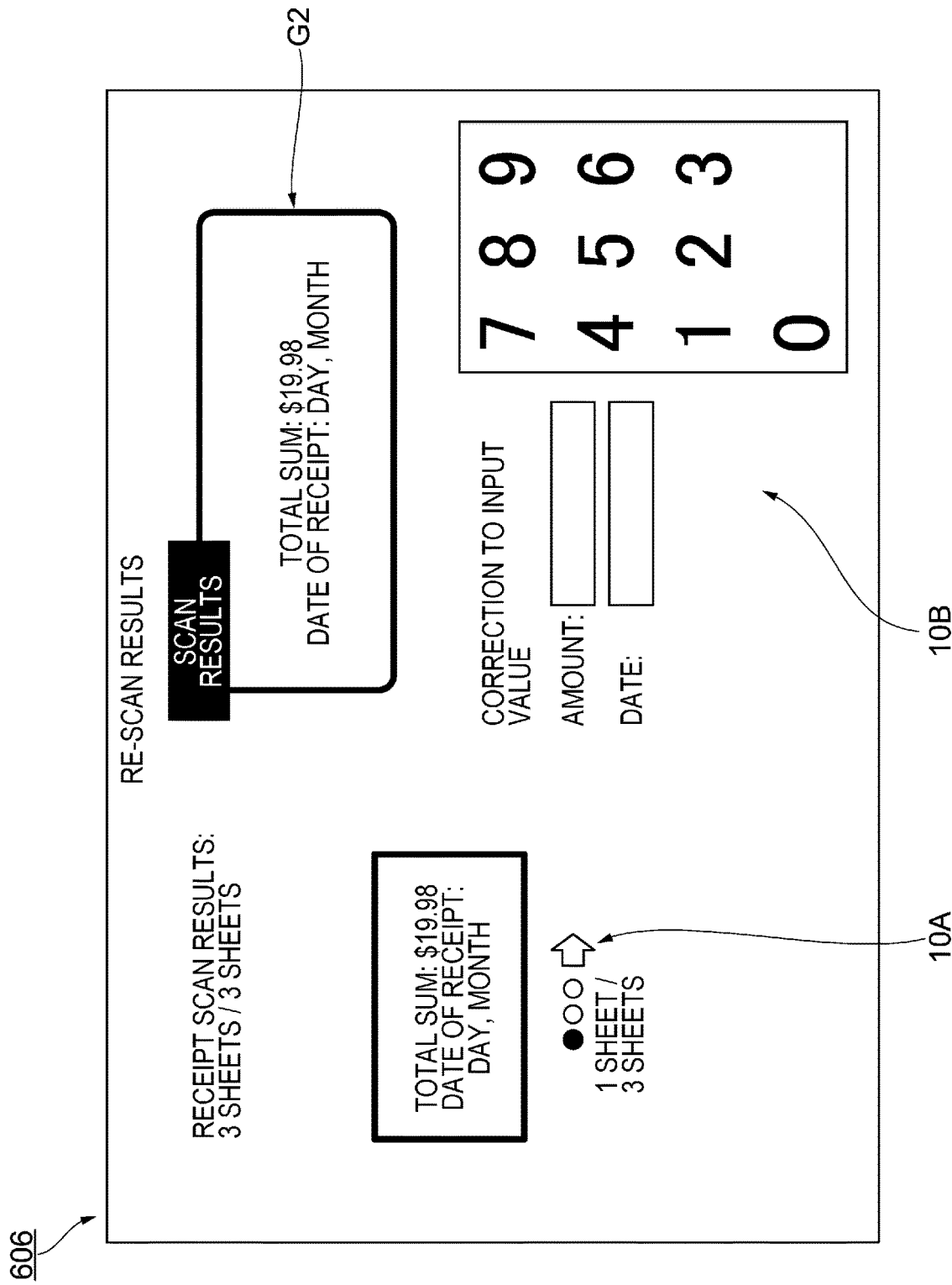

INFORMATION PROCESSING SYSTEM AND READING DEVICE FOR ACQUIRING TARGET CONTENT INFORMATION FROM RECORDING MEDIUM AND OUTPUTTING INFORMATION ABOUT ERRONEOUS RECORDING MEDIUM

CROSS-REFERENCE TO RELATED APPLICATIONS

This application is based on and claims priority under 35 USC 119 from Japanese Patent Application No. 2020-138901 filed Aug. 19, 2020.

BACKGROUND

(i) Technical Field

The present disclosure relates to an information processing system and a reading device.

(ii) Related Art

Japanese Unexamined Patent Application Publication No. 2018-116536 discloses an information analysis system. In the information analysis system, an analysis device analyzes data read by a reading device. A display in the information analysis system successively displays on a per receipt basis at least part of an image and text data received from the analysis device.

Japanese Unexamined Patent Application Publication No. 2019-145981 discloses a process that acquires one or more target images to be processed and selects a useful service from among multiple services.

A recording medium, such as a receipt, is read and an image resulting from reading is analyzed. Information written on each recording medium is thus acquired.

A user may verify whether information has been appropriately acquired or not by referring to reading results. In such a case, a verification operation is to be performed on a per recording medium basis. The verification operation on a large number of recording media leads to larger user workload.

SUMMARY

Aspects of non-limiting embodiments of the present disclosure relate to reducing user workload more in acquiring information recorded on each of recording media than when a user verifies by referring to reading results of the recording media whether reading has been appropriately performed.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing system including a processor configured to: make an attempt to acquire, from recording medium images obtained by reading a plurality of recording media, target content information recorded on each of the plurality of recording media; and among the plurality of recording media, output information about an erroneous recording medium, the erroneous recording medium being (a) a recording medium of which the attempted acquisition of the target content information has been unsuccessful or (b) a recording medium of which the target content information acquired by the attempted acquisition does not satisfy a predetermined condition.

BRIEF DESCRIPTION OF THE DRAWINGS

FIG. 9 illustrates a display example on the user terminal; and

FIG. 10 illustrates a display example on a display of the image forming apparatus.

DETAILED DESCRIPTION

Figure 1:
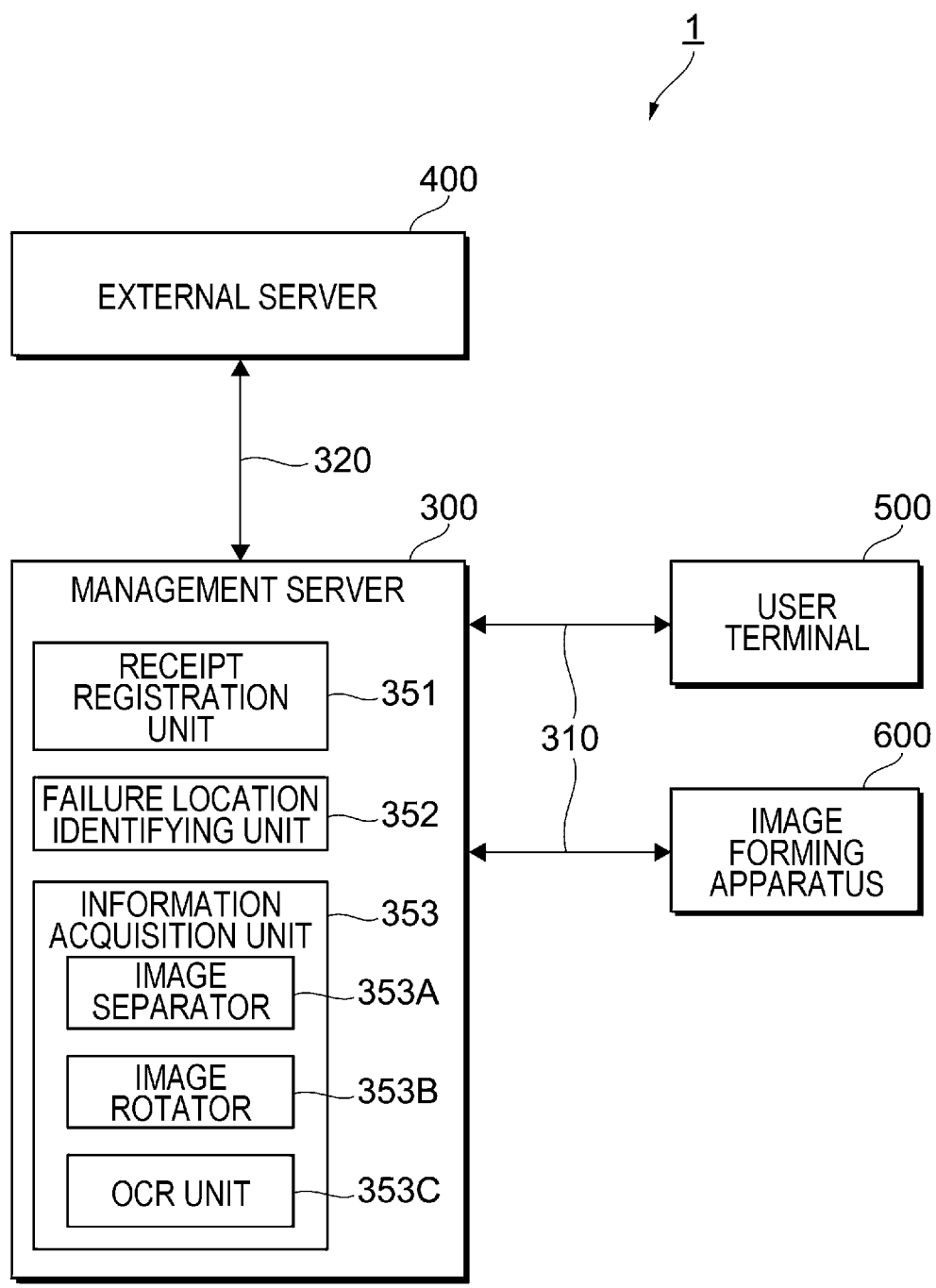
FIG. 1 illustrates a whole configuration of an information processing system.

FIG. 1 illustrates a whole configuration of an information processing system 1 of the exemplary embodiment.

The information processing system 1 includes a management server 300 serving as an example of an information processing apparatus. The information processing system 1 also includes an external server 400 to which information acquired by the management server 300 is transmitted. The information processing system 1 further includes a user terminal 500 held by each user and an image forming apparatus 600 with an image reading function.

Multiple user terminals 500 and multiple image forming apparatuses 600 are include in the information processing system 1 although all of them are not illustrated in FIG. 1.

The user terminal 500 is, for example, a smart phone. The user terminal 500 may not necessarily be a smart phone but may be another device including a camera (having an imaging function and an image reading function). For example, the user terminal 500 may be a tablet terminal including a camera, a camera having a communication function, or a game machine having a camera function and a communication function.

According to the exemplary embodiment, the user terminal 500, image forming apparatus 600, and management server 300 are interconnected to each other via a communication network 310, such as the Internet. The management server 300 and the external server 400 are also interconnected to each other via a communication network 320.

Figure 2:
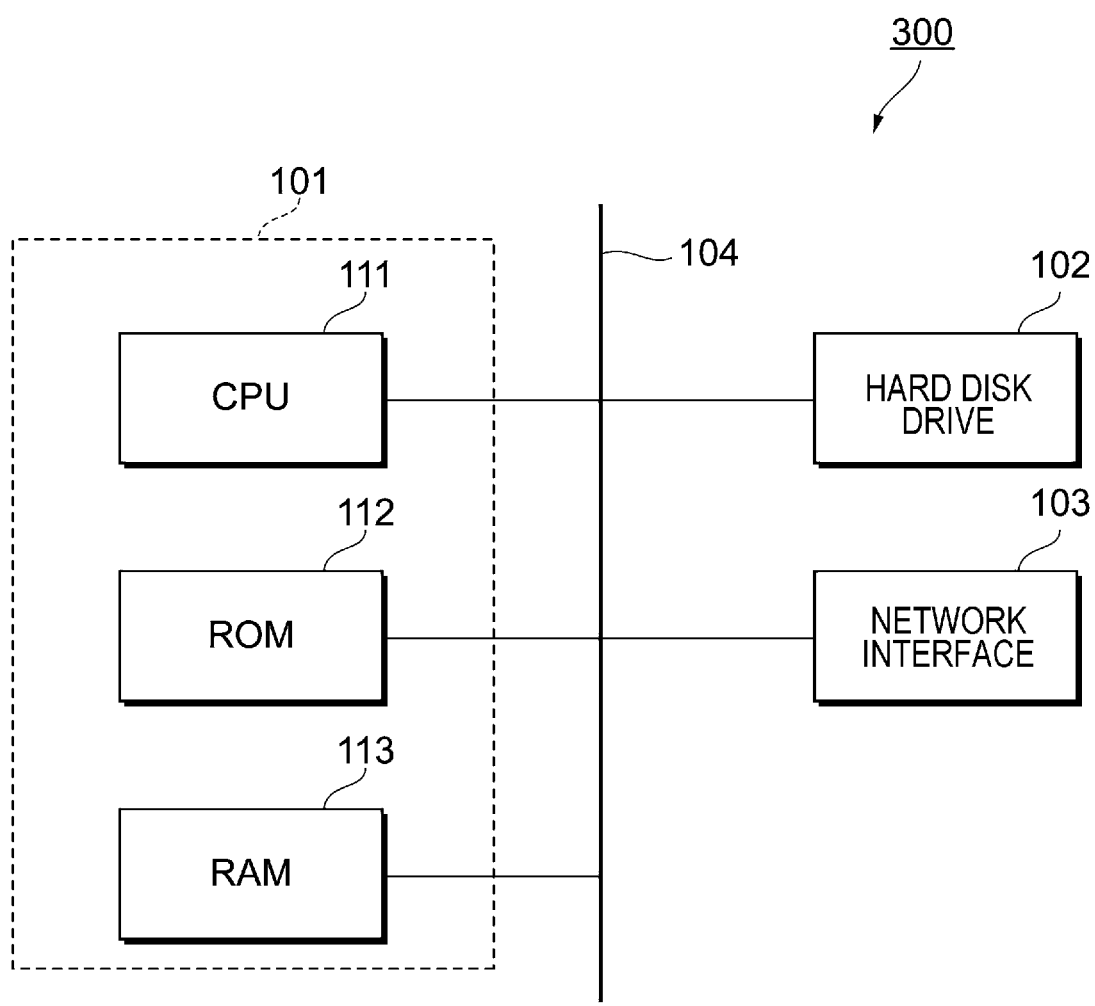
FIG. 2 illustrates an example of a hardware configuration of a management server.

FIG. 2 illustrates an example of a hardware configuration of the management server 300. The management server 300 includes a control unit 101 controlling the whole process of the management server 300, a hard disk drive 102 serving as an example of an information storage device storing information, and a network interface 103 performing communications via a local-area network (LAN) cable or the like.

The control unit 101 includes a central processing unit (CPU) 111 serving as an example of a processor, a read-only memory (ROM) 112 storing an operating system and a basic input output system (BIOS), and a random-access memory (RAM) 113 serving as a work area.

The CPU 111 may be a multi-core CPU. The ROM 112 may be a rewritable non-volatile semiconductor memory. The control unit 101 is a computer.

According to the exemplary embodiments, the CPU 111 performs the process described below by executing a program stored on the ROM 112 or the like.

The hard disk drive 102 reads or writes data onto a disk as a non-volatile recording medium having a disk surface with a magnetic material applied thereon. Alternatively, the non-volatile recording medium may be a semiconductor memory or a magnetic tape.

The management server 300 may be input devices, such as a keyboard and a mouse, and a display device, such as a liquid-crystal display.

The control unit 101, hard disk drive 102, and network interface 103 are connected to each other via a bus 104 and a signal line (not illustrated).

The program executed by the CPU 111 may be delivered to the management server 300 in a stored state on a computer readable recording medium, such as a magnetic recording medium (like a magnetic tape or a magnetic disk), optical recording medium (such as an optical disk), magneto-optical recording medium, or semiconductor memory.

The program executed by the CPU 111 may be delivered to the management server 300 via a communication medium, such as the Internet.

In the exemplary embodiments, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the exemplary embodiments, the term "processor" is broad enough to encompass one processor or plural processors in collaboration which are located physically apart from each other but may work cooperatively. The order of operations of the processor is not limited to one described in the exemplary embodiments, and may be changed.

FIG. 1 illustrates functional units implemented by the CPU 111 in the management server 300. The functional units in FIG. 1 are used to read receipts.

Referring to FIG. 1, the management server 300 includes a receipt registration unit 351, failure location identifying unit 352, and information acquisition unit 353.

The receipt registration unit 351 performs a process related to a receipt, such as a registration operation to register information acquired from the receipt (described below) with the external server 400.

The failure location identifying unit 352 identifies a location from which an attempt to acquire entry information of the receipt has failed.

The information acquisition unit 353 includes an image separator 353A, image rotator 353B, and OCR unit 353C. The information acquisition unit 353 analyzes an image acquired from multiple receipts described below and extracts information from each receipt.

The CPU 111 in the management server 300 implements the receipt registration unit 351, failure location identifying unit 352, and information acquisition unit 353 by executing a program stored on the ROM 112 or other memory. The management server 300 incudes a plugin used to acquire information from the receipt. According to the exemplary embodiments, the plugin implements the information acquisition unit 353.

Specifically, according to the exemplary embodiments, the CPU 111 as an example of a processor implements the receipt registration unit 351, failure location identifying unit 352, and information acquisition unit 353 illustrated in FIG. 1 by executing the program stored on the ROM 112 and the like. According to the exemplary embodiments, these functional units performs the processes described below.

Figure 3:
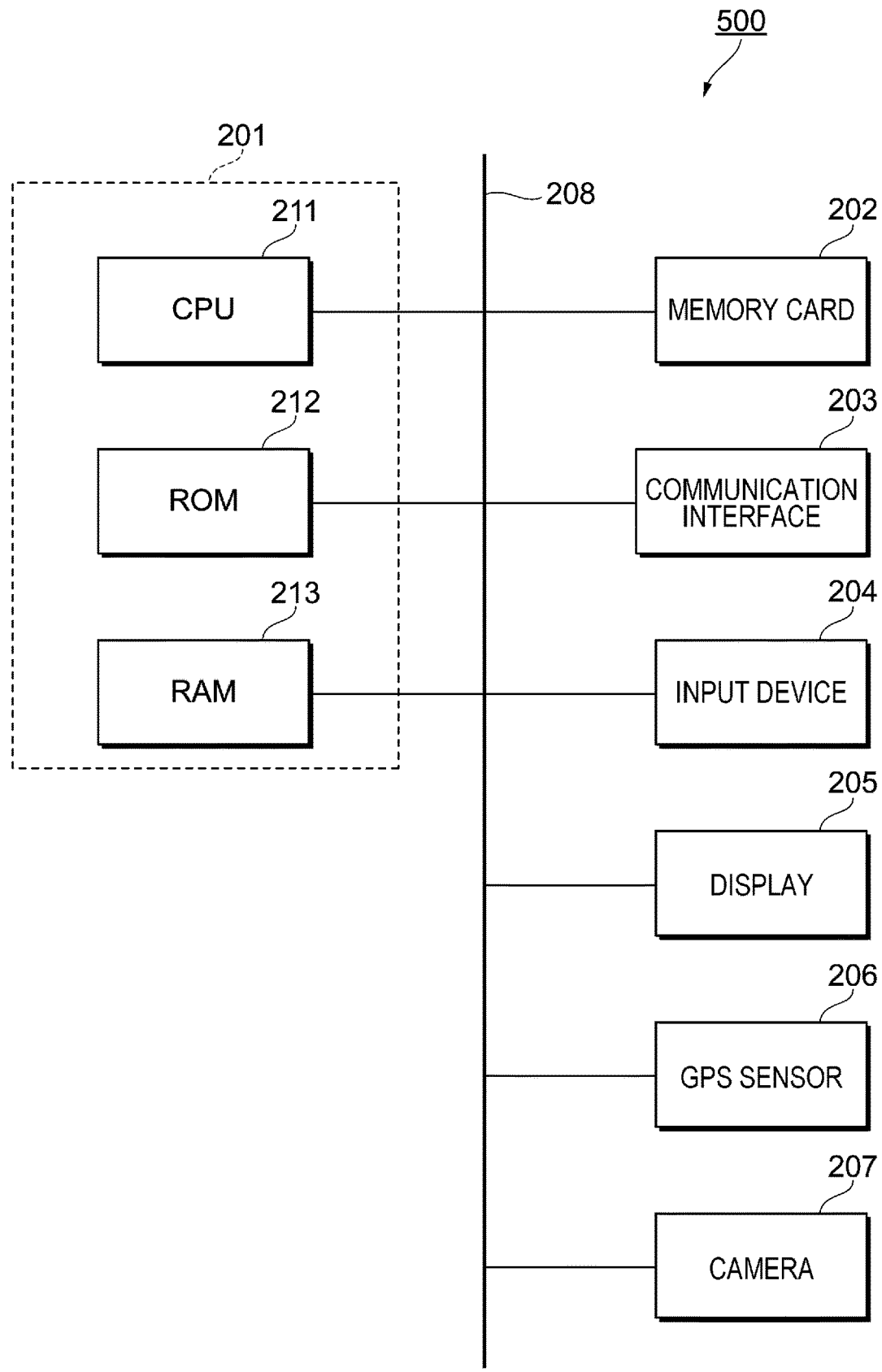
FIG. 3 illustrates an example of a hardware configuration of a user terminal.

FIG. 3 illustrates an example of a hardware configuration of the user terminal 500. The configuration in FIG. 3 assumes that the user terminal 500 is a smart phone.

The user terminal 500 includes a controller 201, memory card 202 controlling the process of the whole user terminal 500, variety of communication interfaces 203 complying with radio communication standards, input device 204, such as a touch sensor, display 205, such as a liquid-crystal display or an electroluminescent display, global position sensor (GPS) 206, and camera 207.

The controller 201 includes a CPU 211, a ROM 212 storing firmware and BIOS, and RAM 213 used as a work area. The CPU 211 may be a multi-core CPU. The ROM 212 may be a rewritable non-volatile semiconductor memory.

The communication interface 203 may be used to connect to a mobile communication system and/or a wireless local area network (LAN).

The GPS sensor 206 fixes the position of the user terminal 500 by receiving a radio wave from GPS satellites. Information on latitude, longitude, and altitude output from the GPS sensor 206 indicates the present position of the user terminal 500. The GPS sensor 206 may correspond to an indoor position fixing system.

The camera 207 includes a charge-coupled device (CCD) and a complementary metal oxide semiconductor (CMOS) and photographs target objects surrounding the user terminal 500.

Figure 4:
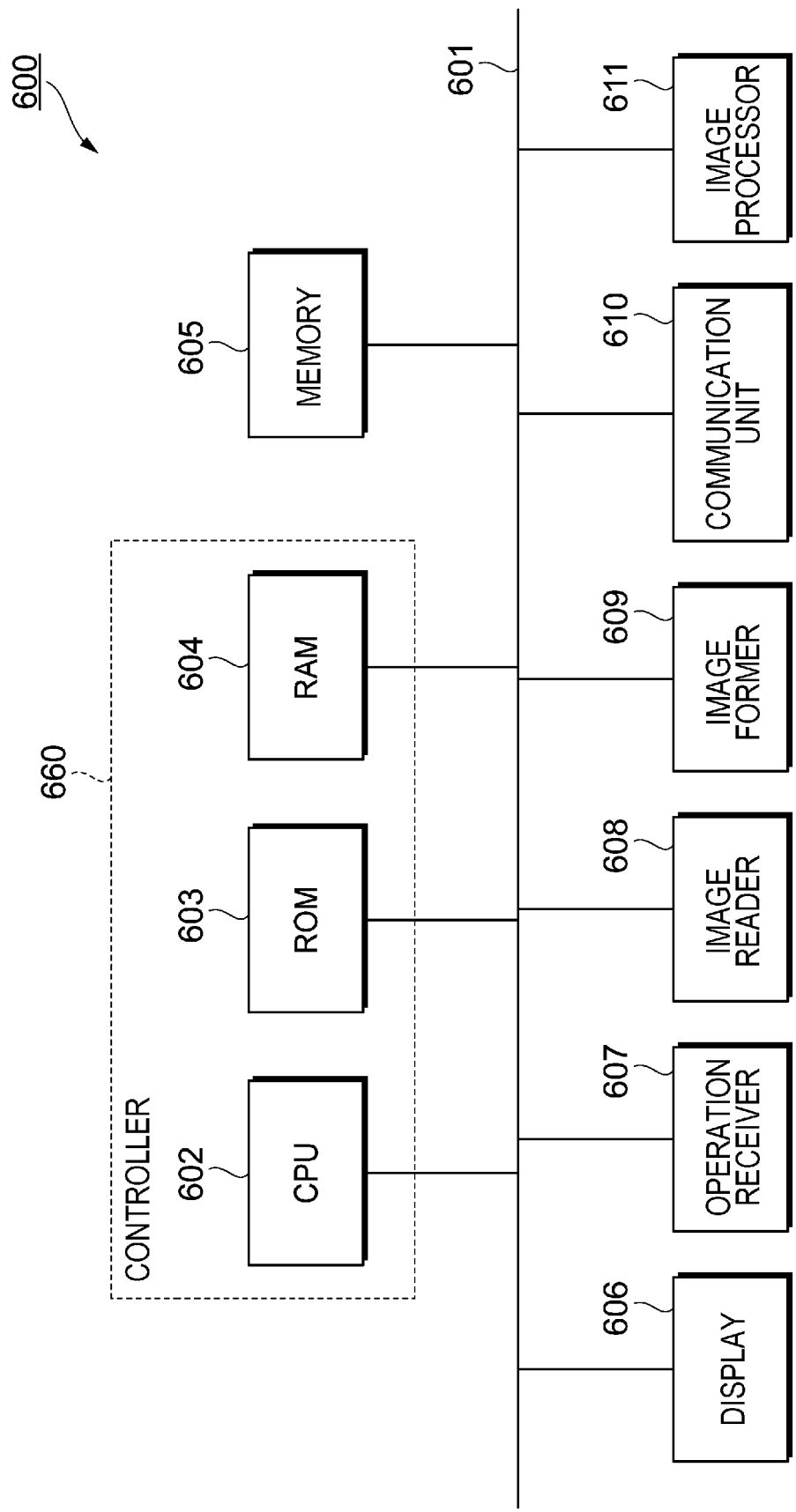
FIG. 4 is a functional block diagram illustrating an image forming apparatus.
Figure 5:
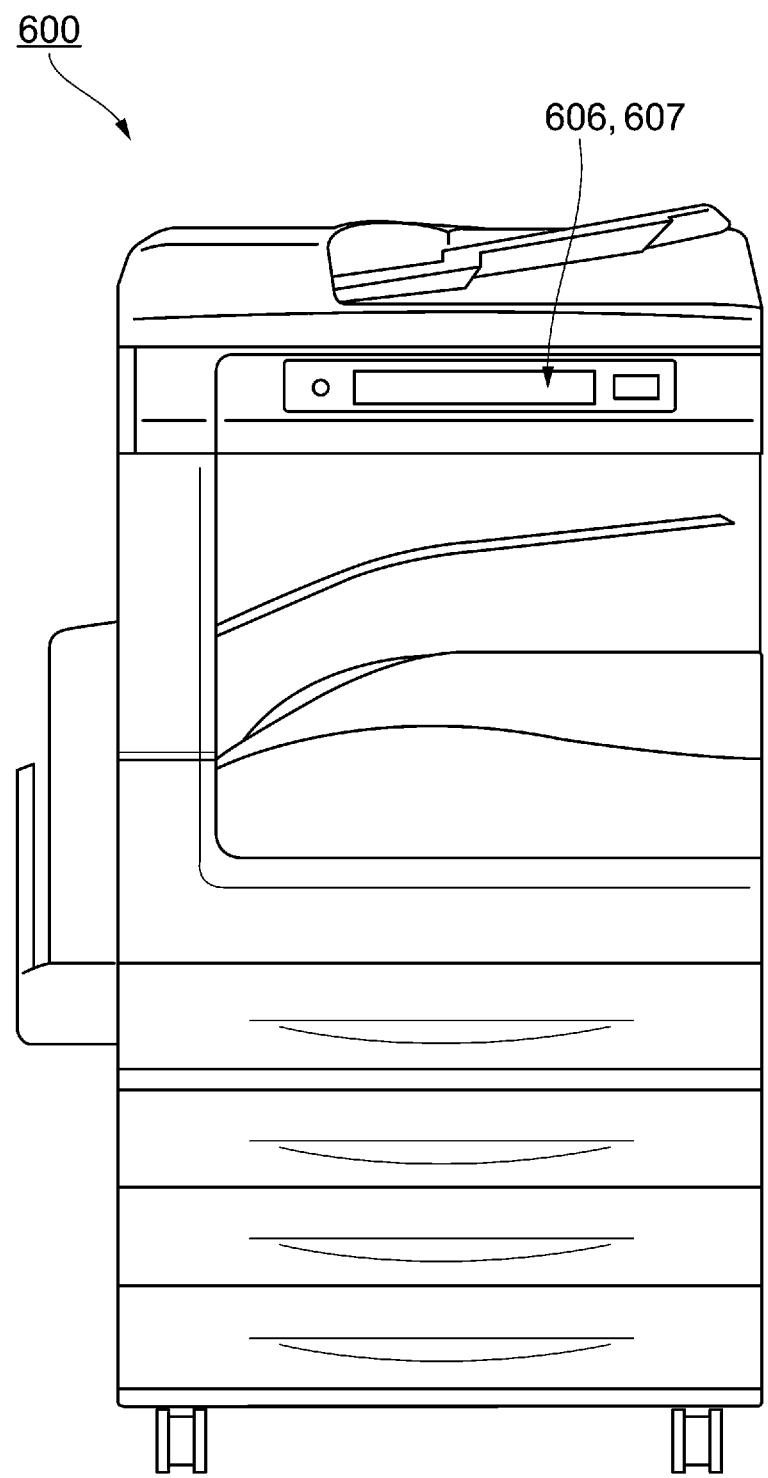
FIG. 5 is a front view of the image forming apparatus.

FIG. 4 is a functional block diagram illustrating the image forming apparatus 600. FIG. 5 is a front view of the image forming apparatus 600.

The image forming apparatus 600 has a function of reading an image on a document, such as a receipt, and is constructed as a reading device.

Referring to FIG. 4, the functional units forming the image forming apparatus 600 of the exemplary embodiments are connected to a bus 601 and transmits or receives data via the bus 601.

A display 606 notifies a user operating the image forming apparatus 600 of information by displaying an image thereon. Referring to FIG. 5, the display 606 is rectangular. For example, the display 606 includes a liquid-crystal display or an organic electroluminescent (EL) display and notifies the user operating the image forming apparatus 600 of information.

An operation receiver 607 (see FIGS. 4 and 5) receives an operation from the user. Specifically, the operation receiver 607 receives user operation related to display contents displayed on the display 606.

Each of the display 606 and the operation receiver 607 includes, for example, a touch panel display and are mounted in a state with the operation receiver 607 overlapping the display 606.

According to the exemplary embodiments, the operation receiver 607 is a touch panel display. Alternatively, the operation receiver 607 may be a pointing device, such as a mouse.

The display 606 (see FIG. 4) is controlled by the controller 660. According to the exemplary embodiments, the user operation for the display contents on the display 606 is received by the operation receiver 607.

According to the exemplary embodiments, a process responsive to the user operation received by the operation receiver 607 is performed.

An image reader 608 as an example of a reading unit includes a scanner, reads an image on a set document and creates an read image of the document (image data). According to the exemplary embodiments, the image reader 608 reads multiple receipts as described below.

The image former 609 forms a toner image responsive to the image data on a paper sheet as an example of the recording medium through an electrophotographic method. Alternatively, the image former 609 may form an image through other method, such as inkjet head method.

A communication unit 610 is connected to the communication network 310 (see FIG. 1) and serves as a communication interface that communicates with the management server 300.

The image processor 611 preforms image processing on an image represented by the image data. For example, the image processing includes color correction and gradation correction.

A memory 605 includes a hard disk device and stores, for example, data received by the communication unit 610 or an image read by the image reader 608 (the image data).

The controller 660 controls each element of the image forming apparatus 600. The controller 660 includes a CPU 602, ROM 603, and RAM 604.

The ROM 603 stores a program to be executed by the CPU 602. The CPU 602 reads a program from the ROM 603 and executes the read program using the RAM 604 as a work area.

The program executed by the CPU 602 may be delivered to the image forming apparatus 600 in a stored state on a computer readable recording medium, such as a magnetic recording medium (like a magnetic tape or a magnetic disk), optical recording medium (optical disk), magneto-optical recording medium, or semiconductor memory.

The program to be executed by the CPU 602 may be downloaded to the image forming apparatus 600 via a communication medium, such as the Internet.

First Exemplary Embodiment

Figure 6:
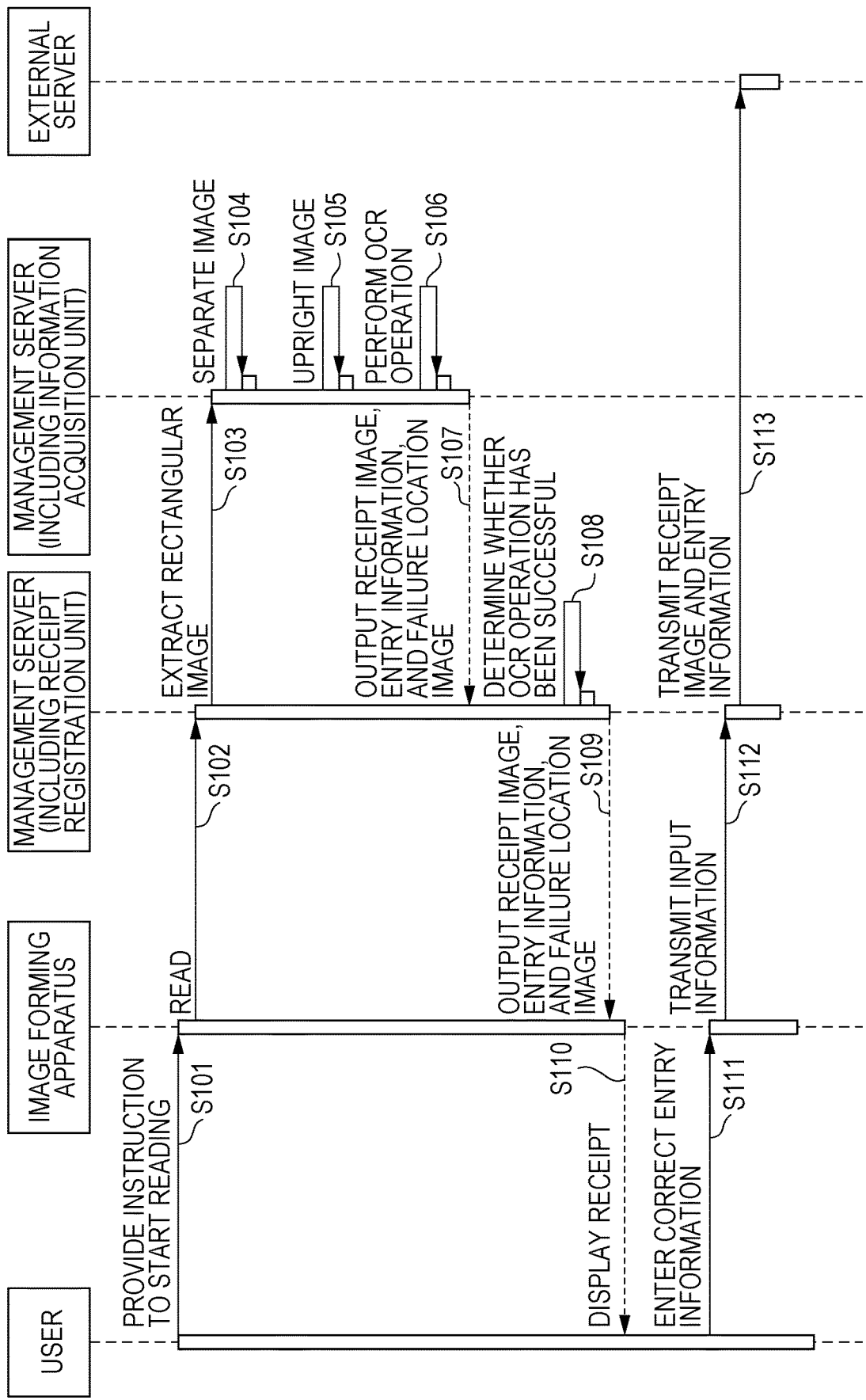
FIG. 6 is a sequence chart of a process performed by the information processing system of a first exemplary embodiment.

FIG. 6 is a sequence chart of a process performed by the information processing system 1 of a first exemplary embodiment.

According to the first example embodiment, the user sets multiple receipts as examples of recording media side by side on the image reader 608 in the image forming apparatus 600 (see FIG. 4).

The user then presses a start button (not illustrated) on the image forming apparatus 600 to provide an instruction to start reading the receipts (step S101). In other words, the user provides the instruction to start reading information recorded on the receipts.

The image reader 608 serving as an example of the reading unit reads multiple receipts (step S102), thereby capturing a read image. Specifically, the image reader 608 captures the read image including multiple receipt images respectively representing receipts.

In other words, the image representing each receipt is an example of a medium image and the image reader 608 captures the read image including multiple medium images.

According to the first example embodiment, the image forming apparatus 600 transmits the read image to the management server 300 and the management server 300 captures the read image.

Specifically, the receipt registration unit 351 extracts a rectangular-shaped image (hereinafter simply referred to as a "rectangular image") included in the read image (step S103).

The image separator 353A in the information acquisition unit 353 separates each of the rectangular images from an image surrounding the rectangular image (step S104). The image rotator 353B rotates each of the rectangular images to upright the rectangular image (step S105).

The OCR unit 353C performs an optical character recognition (OCR) operation (step S106), thereby acquiring information included in each of the upright rectangular images.

In other words, the OCR unit 353C acquires, entry information, information recorded on each of the receipts.

The OCR unit 353C acquires as the entry information recorded on each of the receipts, character information, such as date and amount of money. According to the first exemplary embodiment, the entry information recorded on the receipts is acquired on a per receipt basis.

According to the first exemplary embodiment, the information acquisition unit 353 outputs the image of each receipt (upright rectangular image, hereinafter referred to as a "receipt image") and the entry information acquired from each of the receipt images.

According to the first exemplary embodiment, there is a possibility that the OCR unit 353C fails to acquire the entry information. The information acquisition unit 353 compensates for a location of the acquisition failure of the entry information using a predetermined default value.

In other words, the information acquisition unit 353 outputs as the entry information the predetermined default value for the location where the acquisition of the entry information fails. In such a case, the entry information that is different from the original entry information is output.

Specifically, if the print of the receipt is light or the receipt is folded, the reading of the receipt may be difficult.

This may lead to an irregularity in which the acquisition of the entry information is not possible. As described above, the information acquisition unit 353 compensates for the location of the acquisition failure of the entry information with the predetermined default value and thus outputs the default value.

According to the first exemplary embodiment, the failure location identifying unit 352 extracts an image of the location where the OCR unit 353C has failed to acquire the entry information (failure location image). The information acquisition unit 353 outputs the extracted failure location information in association with the receipt image.

According to the first exemplary embodiment, the information acquisition unit 353 outputs the receipt image, entry image, and failure location image (step S107).

Specifically, the information acquisition unit 353 outputs the receipt image, entry image, and failure location image for the receipt from which the OCR unit 353C has failed to acquire the entry information. The information acquisition unit 353 outputs the receipt image and entry information for the receipt from which the OCR unit 353C has successfully acquired the entry information.

According to the first exemplary embodiment, the receipt registration unit 351 determines whether the OCR operation has been successful or not (step S108).

Specifically, the receipt registration unit 351 determines whether the information output by the information acquisition unit 353 includes a failure location image.

If the information output from the information acquisition unit 353 includes a failure location image, the receipt registration unit 351 determines that the OCR operation has failed for the receipt from which the failure location image originates.

If the receipt registration unit 351 determines that the OCR operation has failed, in other words, the entry information has not been acquired, the receipt registration unit 351 outputs to the image forming apparatus 600 information on the receipt from which the entry information has not been successfully acquired.

Specifically, the receipt registration unit 351 outputs to the image forming apparatus 600 the receipt image, entry information (default value), and failure location image of the receipt from which the entry information has not been successfully acquired (step S109).

The failure location image is an example of information on the location where an attempt to acquire the entry information has failed. According to the first exemplary embodiment, the receipt registration unit 351 outputs to the image forming apparatus 600 the information on the location where the attempt to acquire the entry information has been made.

The image forming apparatus 600 has read the receipts serving the acquisition target of the entry information. According to the first exemplary embodiment, the information, such as the failure location image, is output to the image forming apparatus 600 that has read the receipts.

According to the first exemplary embodiment, the receipt image and entry information are output together with the failure location image to the image forming apparatus 600.

According to the first exemplary embodiment, the failure location image is output as the information on the receipt from which the entry information has not been successfully acquired, together with the receipt image and the entry information.

The receipt image as an example of a medium image is an image of the whole receipt. The receipt image is the predetermined default value.

According to the first exemplary embodiment, the information on the receipt from which the entry information has not been successfully acquired is displayed on the display 606 in the image forming apparatus 600 (see FIGS. 4 and 5) (step S110).

Specifically, according to the first embodiment, the receipt image, entry information, and failure location image are displayed on the display 606 as the information on the receipt from which the receipt image has not been successfully acquired.

Figure 7:
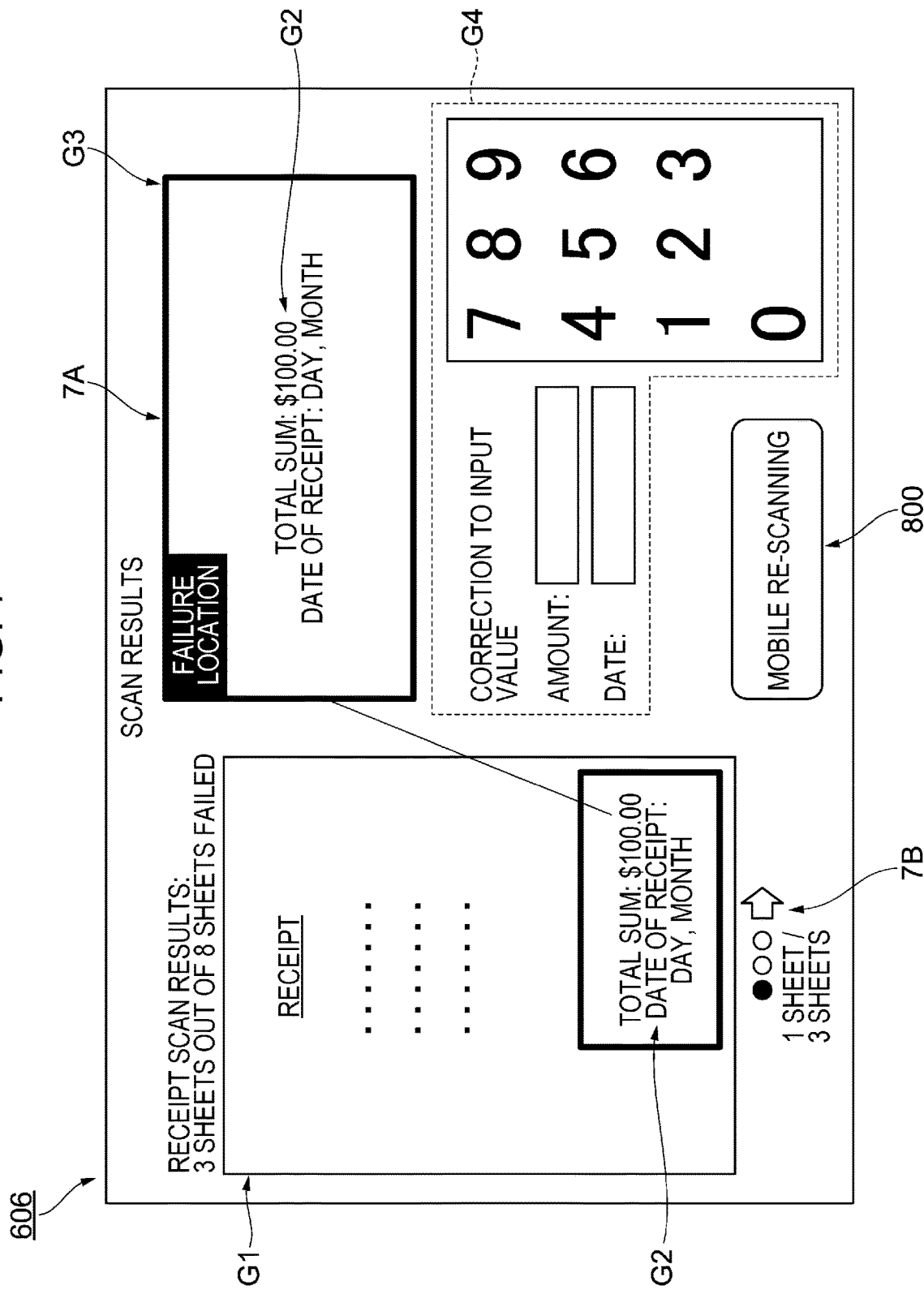
FIG. 7 illustrates a display example on a display of the image forming apparatus.

FIG. 7 illustrates a display example on the display 606 in the image forming apparatus 600.

The display 606 of the first exemplary embodiment displays a receipt image G1, entry information G2, and failure location image G3.

The image forming apparatus 600 acquires the receipt image G1 by reading a receipt and the receipt image G1 represents the whole receipt.

According to the first exemplary embodiment, an image denoted by alphanumeric characters 7A indicates the failure location image G3. The failure location image G3 indicates the location from which the entry information G2 on the receipt (the original correct entry information G2) has not been successfully acquired.

The region of the entry information G2 illustrated in FIG. 7 is not an image but text information acquired by the OCR unit 353C or the default value obtained in the compensation described above.

Specifically, information, such as "total sum," "date of receipt," and "day and month" out of the entry information G2 is text information acquired by the OCR unit 353C. Information, such as "$100.00", out of the entry information G2 is the default value acquired in the compensation.

The entry information G2 compensated for with the default value is displayed at a display location of the failure location image G3.

Specifically, the "total sum" is displayed as an example of amount of money information and the "date of receipt" is displayed as an example of date information in the display location of the failure location image G3. The amount of money "$100.00" displayed in the region of the total sum is not a correct value but a default value.

According to the first exemplary embodiment, the incorrect value is compensated for with the default value and the default value is thus displayed. Alternatively, the default value is not displayed with the region for the default value left blank.

The display 606 displays as a part of the screen a screen G4 that the user uses to input information recorded on the receipt (hereinafter referred to as an "input screen G4").

In other words, the display 606 in the image forming apparatus 600 displays the input screen G4 that the user uses to input the correct entry information G2.

According to the first exemplary embodiment, the user operates the input screen G4 to input the correct entry information recorded on the receipt (see step S111 in FIG. 6). In other words, according to the first embodiment, the user corrects the default value acquired by the management server 300.

Specifically, the amount of money is not correct and the user inputs information on the correct amount of money by operating the display 606.

FIG. 7 illustrates a first one of three receipts from which the entry information G2 has not been successfully acquired.

Specifically, according to the first embodiment, the entry information has not been successfully acquired from the three receipts. The screen in FIG. 7 displays the first receipt out of the three receipts from which the entry information has not been successfully acquired.

The user inputs the information on the correct amount of money for the first receipt and selects the portion denoted by alphanumeric characters 7B. In this way, screen shifting is performed to display information on a second receipt.

The user then inputs correct information on the second receipt by operating the display 606.

The user further selects the portion denoted by the alphanumeric characters 7B in FIG. 7. Screen shifting is further performed displaying information on a third receipt.

The user may input the correct information on the third receipt by operating the display 606.

According to the first exemplary embodiment, the information input on the image forming apparatus 600 by the user is transmitted to the management server 300 (see step S112 in FIG. 6) and the management server 300 acquires the input information. In other words, the management server 300 acquires the correct entry information G2 input by the user.

The management server 300 then replaces the incorrect entry information G2 with the correct entry information G2. In other words, the management server 300 replaces the default information with the correct entry information G2.

According to the first exemplary embodiment, the receipt registration unit 351 in the management server 300 transmits to the external server 400 the receipt image G1 and entry information G2 (corrected entry information G2) acquired from each of the receipts (see step S113 in FIG. 6).

In this way, the receipt image G1 and entry information G2 for each of the receipts are registered on the external server 400.

When the entry information G2 is transmitted to the external server 400, the entry information G2 of the receipt from which the entry information G2 has been correctly acquired is transmitted to the external server 400.

Concerning the receipt with the default value replaced with the correct entry information G2, that correct entry information G2 is transmitted to the external server 400.

As described above, the display 606 in the image forming apparatus 600 displays the failure location image G3 as an example of information on the location where an attempt to acquire the entry information G2 has been performed.

The information on the location where an attempt to acquire the entry information G2 has been performed is not limited to the failure location image G3.

The information on the location where an attempt to acquire the entry information G2 has been performed may be a message something like "The amount column of the receipt having the title "ABC" has not been successfully read."

Another message may be something like "The date column of the third receipt from the top out of the vertically arranged receipts has not been successfully read."

The information on the location where an attempt to acquire the entry information G2 has been performed is not limited to the failure location image G3 but may be text information as described above.

A determination as to whether the reading of each receipt has been successful may be left to the user by notifying the user of the reading results. In such a case, however, this may be time consuming because the user may be obliged to perform the determination on all the receipts.

According to the first exemplary embodiment, the location where the reading has failed is identified and then notified of the user. The user is thus free from performing the determination on all the receipts and the user workload may be reduced.

According to the first exemplary embodiment, the user inputs the correct information via the image forming apparatus 600 and the user workload may thus be reduced.

In order to re-acquire the entry information G2, the user may set again on the image forming apparatus 600 a receipt from which the entry information G2 has not successfully acquired. In such a case, a target receipt may be selected from multiple receipts and set on the image forming apparatus 600.

In contrast, according to the first exemplary embodiment, the entry information G2 may be re-acquired without setting again the receipt on the image forming apparatus 600. The user workload may thus be reduced.

Second Exemplary Embodiment

The receipts may be processed by using the image forming apparatus 600 and management server 300 in the first exemplary embodiment.

Alternatively, apparatuses processing the receipts are not limited to the image forming apparatus 600 and management server 300.

Figure 8:
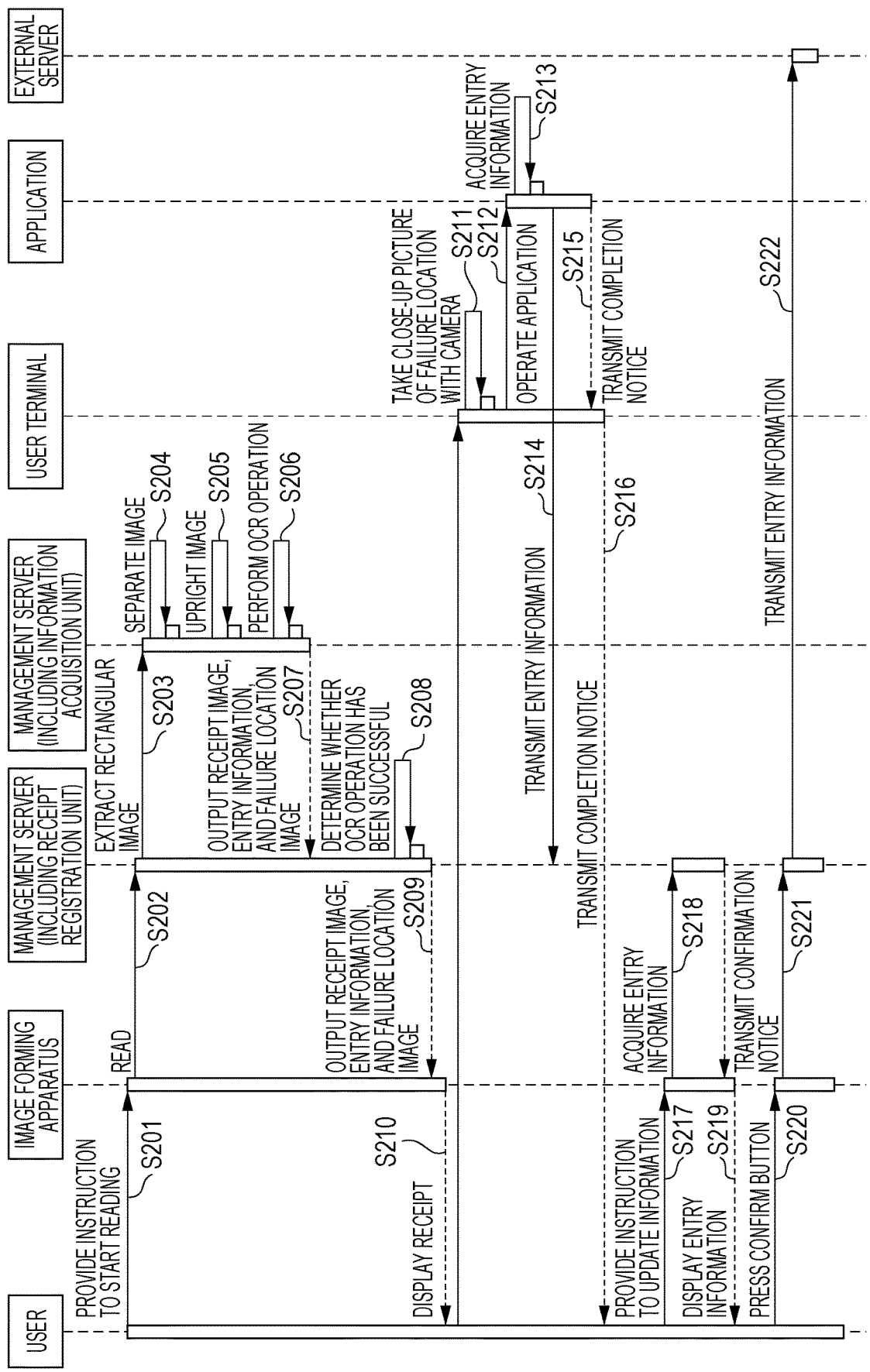
FIG. 8 is a flow chart of a process performed on a receipt by a user terminal.

FIG. 8 illustrates a process that is performed on the receipts by using the user terminal 500.

In the process in FIG. 8, operations in steps S201 through S208 are respectively identical to the operations in steps S101 through S108 in FIG. 6.

Operations in step S209 and thereafter are described below. In the following discussion, the acquisition of the entry information G2 has failed from three receipts.

In step S209, the management server 300 outputs to the image forming apparatus 600 the receipt image G1, the entry information G2, and the failure location image G3 in a similar way as described above.

The screen in FIG. 7 is displayed on the display 606 in the image forming apparatus 600 in a similar way as described above. The information on the receipt from which the entry information G2 has not been successfully acquired is displayed on the display 606 (step S210).

In the process herein, a select button 800 labeled "mobile re-scanning" displayed on the screen in FIG. 7 is selected.

If the select button 800 is selected, a screen in FIG. 9 (a display example on the user terminal 500) is displayed on the user terminal 500 as an example of a second reading device.

Specifically, if the select button 800 is selected, an application pre-stored on the user terminal 500 is started up and the screen in FIG. 9 is displayed.

The screen displays a description to read the receipt. This display example displays the description across several rows. The display example displays text reading "Take close-up picture of portion of failure location."

The user visually checks a first receipt corresponding to the receipt image G1 of the first receipt illustrated in FIG. 7 by operating the user terminal 500 and reads the actual first receipt using the camera 207 in the user terminal 500 (see FIG. 3).

Specifically, the user takes a close-up picture of a portion of the actual first receipt as the failure location image G3 using the camera 207 (step S211 in FIG. 8).

According to the second exemplary embodiment, the user terminal 500 is a portable terminal device including the camera 207. This terminal device is used to take a picture of the actual first receipt.

According to the second exemplary embodiment, the user terminal 500 having a reading resolution higher than that of the image reader 608 in the image forming apparatus 600 reads the actual first receipt.

According to the second exemplary embodiment, the user terminal 500 having a reading resolution higher than that of the image reader 608 in the image forming apparatus 600 is used to read the actual first receipt.

Smart phones having a reading resolution higher than that of the image reader 608 in the image forming apparatus 600 are commercially available today.

According to the second exemplary embodiment, a smart phone may be used as the user terminal 500 to read the actual first receipt at a reading resolution higher than that of the image reader 608 in the image forming apparatus 600.

The user terminal 500 is designed to take a close-up picture. In other words, the user terminal 500 is designed to photograph an object in enlargement. According to the second exemplary embodiment, the user photographs a failure location in enlargement (a portion of the actual first receipt displayed as the failure location image G3).

According to the second exemplary embodiment, the portion displayed as the failure location image G3 in the actual first receipt in the receipt image G1 in FIG. 7 is photographed at a reading resolution higher than that of the image forming apparatus 600.

According to the second exemplary embodiment, the portion displayed as the failure location image G3 is photographed in enlargement.

Referring to FIG. 7, the first receipt out of the three receipts from which the entry information G2 has not successfully acquired is displayed as described above. The user photographs the actual first receipt by operating the user terminal 500 and the portion denoted by the alphanumeric characters 7B in FIG. 7 is thus selected.

Screen shifting is thus performed to display the information on the second receipt on the display 606.

The user photographs the second receipt by operating the user terminal 500. Specifically, the user takes a close-up picture of the portion identified by the failure location image G3 out of the two receipts.

The user photographs the second receipt and selects the portion denoted by the alphanumeric characters 7B in FIG. 7 to perform screen shifting.

Information on the third receipt is thus displayed. The user photographs the third receipt by operating the user terminal 500. Specifically, the user takes a close-up picture of the portion identified by the failure location image G3 of the third receipt in a similar way as described above.

According to the second exemplary embodiment, the user manually shifts the screen by operating the display 606. The screen shifting may be automatically performed on the display 606 each time the user photographs using the user terminal 500.

According to the second exemplary embodiment, when the user terminal 500 photographs all three receipts, the user performs a predetermined operation on an application running on the user terminal 500 (step S212 in FIG. 8).

Specifically, the user performs the predetermined operation on the screen displayed on the application running on the user terminal 500.

According to the second exemplary embodiment, the application analyzes the photographed images of the three receipts and acquires the entry information G2 included in the photographed images (step S213).

According to the second exemplary embodiment, the reading results acquired by the user terminal 500 as another device different from the image forming apparatus 600 are analyzed by the user terminal 500. The user terminal 500 then acquires the entry information G2 acquired through the analysis.

According to the second exemplary embodiment, if the user presses a "transmit" button with alphanumeric characters 9A in FIG. 9, the entry information G2 is transmitted from the user terminal 500 to the management server 300 (step S214 in FIG. 8).

The receipt registration unit 351 in the management server 300 receives the entry information G2 that the user terminal 500 has acquired through the analysis of the photographed image.

The application running on the user terminal 500 outputs to the user terminal 500 a completion notice indicating the completion of the process (step S215). The user terminal 500 outputs to the user the completion notice indicating the completion of the process (step S216).

The user operates the display 606 in the image forming apparatus 600 and presses an "information update" button (not illustrated) displayed on the display 606 to update information (step S217).

The image forming apparatus 600 accesses the management server 300 and acquires the entry information G2 that the user terminal 500 has acquired through the reading described above (step S218).

Specifically, the image forming apparatus 600 acquires the entry information G2 that is acquired by the user terminal 500 through the analysis and transmitted to the management server 300.

The entry information G2 is displayed on the display 606 in the image forming apparatus 600. In other words, the entry information G2 that has been acquired by taking a close-up picture of the actual receipt using the user terminal 500 is displayed on the display 606 in the image forming apparatus 600 (step S219).

FIG. 10 illustrates the display example on the display 606 in the image forming apparatus 600.

In this example, the entry information G2 that the user terminal 500 has acquired from the three receipts is displayed on the display 606 in the image forming apparatus 600.

The screen on the display 606 is shifted by successively pressing the location denoted by alphanumeric characters 10A. The entry information G2 that the user terminal 500 has acquired for each of the three receipts is displayed.

If any error is found, the user may operate the location denoted by alphanumeric characters 10B and enter correct entry information G2. If a confirm button (not illustrated) is pressed (step S220 in FIG. 8), a confirmation notice is transmitted from the image forming apparatus 600 to the management server 300 (step S221) and the entry information G2 acquired from each of the receipts is confirmed.

According to the second exemplary embodiment, the entry information G2 stored on the management server 300 is transmitted to the external server 400 (step S222).

Referring to FIG. 7, the information on the receipt from which the entry information G2 has not been successfully acquired is output to the image forming apparatus 600.

Alternatively, the information on the receipt from which the entry information G2 has not been successfully acquired may be output to the user terminal 500 as an example of a second reading device different from the image forming apparatus 600.

A screen similar to the screen in FIG. 7 is displayed on the user terminal 500.

The screen similar to the screen in FIG. 7 displayed on the user terminal 500 may have a display layout different from the display layout on the image forming apparatus 600.

When the screen similar to the screen in FIG. 7 is displayed on the user terminal 500, the receipt image G1, entry information G2, and failure location image G3 are displayed on the user terminal 500 in a similar way as described above.

In other words, when the screen similar to the screen in FIG. 7 is displayed on the user terminal 500, the information on the receipt from which the entry information G2 has not been successfully acquired is output to the user terminal 500 and is displayed on the user terminal 500.

In a similar way as described above, the screen on the user terminal 500 displays the receipt image G1 indicating the whole receipt as the information on the receipt from which the entry information G2 has not been successfully acquired.

The screen displayed on the user terminal 500 displays in a similar way as described above the information on the location where an attempt to acquire the entry information G2 has been made. Specifically, the failure location image G3 is displayed in a similar way as described above as the information on the location where the attempt to acquire the entry information G2 has been made.

The screen displayed on the user terminal 500 displays in a similar way as described above the input screen G4 that the user uses to input information recorded on the receipt.

Modifications

In the exemplary embodiments described above, the information on the receipt from which the entry information G2 has not been successfully acquired is output to the image forming apparatus 600 or the user terminal 500.

The information output to the image forming apparatus 600 or the user terminal 500 is not limited to the information on the receipt from which the entry information G2 has not been successfully acquired. The information output to the image forming apparatus 600 or the user terminal 500 may be information on a receipt from which the entry information G2 with the acquired entry information G2 failing to satisfy a specific condition. This information may be referred to as "acquisition entry information G2."

In other words, the information output to the image forming apparatus 600 or the user terminal 500 may be information on a receipt from which the entry information G2 has successfully been acquired but the acquired entry information G2 fails to satisfy the specific condition.

The receipts may include a receipt from which the entry information G2 has not been successfully acquired and a receipt from which the entry information G2 has been acquired with the acquired entry information G2 failing to satisfy the specific condition.

In such a case, the information output to the image forming apparatus 600 or the user terminal 500 may include the information on the receipt from which the entry information G2 has not been successfully acquired and the information on the receipt from which the entry information G2 has been acquired but the acquired entry information G2 fails to satisfy the specific condition.

When the information on the receipt that has provided the entry information G2 failing to satisfy the specific condition is output, the receipt image G1, entry information G2 (entry information G2 compensated for with the default value), and failure location image G3 (information on the location where the acquired entry information G2 is placed) may be output to the image forming apparatus 600 or the user terminal 500 in a similar way as described above.

Concerning the entry information G2, the entry information G2 acquired from the OCR unit 353C may be output in place of the entry information G2 compensated for with the default value to the image forming apparatus 600 or the user terminal 500.

When the information on the receipt that has provided the entry information G2 failing to satisfy the specific condition is output, the receipt image G1 and the failure location image G3 may be output to the image forming apparatus 600 or the user terminal 500.

In such a case, the entry information G2 is not displayed on the image forming apparatus 600 or the user terminal 500 with the region for the entry information G2 left blank.

In this case as well, the image forming apparatus 600 or the user terminal 500 may be designed to display the input screen G4 in a similar way as described above.

The case "the entry information G2 has not been successfully acquired" is intended to mean that the entry information G2 has not been acquired even if other information, such as numerical values or text, is acquired.

For example, the information, such as the words like the "total sum" and the "date of receipt", are attached as illustrated in FIG. 7. Even if the "total sum" and the "date of receipt" are acquired, information indicating the numerical numbers placed beside and corresponding to these words may not possibly be acquired. This corresponds to the case that "the entry information G2 has not been successfully acquired."

The case expressed by the phrase "the acquired entry information G2 failing to satisfy the specific condition" means that while the entry information G2 has been acquired but the acquired entry information G2 fails to satisfy the specific condition.

For example, a numerical value may be acquired as the entry information G2 but the number of digits of the numerical value may be more than or less than a predetermined number of digits. Such a case corresponds to the case of "the acquired entry information G2 failing to satisfy the specific condition."

For example, information other than the numerical value may be acquired in the environment under which the numerical value is available. Such a case corresponds to the case of "the acquired entry information G2 failing to satisfy the specific condition."

Machine learning may be used to improve the reading accuracy of receipts.

Specifically, to address the improvement of the reading accuracy, machine learning may be successively performed based on images of failure locations and correct information subsequently input by the user. Specifically, each time the user enters correct information, machine learning is performed based on the images of failure locations and the correct information.

In other words, to address the improvement of the reading accuracy, parameters used in reading receipts are modified based on the machine learning results.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing system comprising a processor configured to:
   make an attempt to acquire, from recording medium images obtained by reading a plurality of recording media, target content information recorded on each of the plurality of recording media;
   among the plurality of recording media, output information about an erroneous recording medium, the erroneous recording medium being (a) a recording medium of which the attempted acquisition of the target content information has been unsuccessful or (b) a recording medium of which the target content information acquired by the attempted acquisition does not satisfy a predetermined condition, wherein the information about the erroneous recording medium is output to a portable terminal device that includes a camera and is different from a reading device that has read the plurality of recording media; and
   display a mobile-rescanning button configured to, upon selection, output an instruction to re-scan the erroneous recording medium using the portable terminal device by taking a picture of a portion of the erroneous recording medium.

2. The information processing system according to claim 1, wherein the erroneous recording medium is the recording medium of which the attempted acquisition of the target content information has been unsuccessful, and wherein the processor is configured to output information about a specific portion of the erroneous recording medium, the specific portion being a portion from which the attempted acquisition has attempted to acquire the target content information.

3. The information processing system according to claim 1, wherein the erroneous recording medium is the recording medium of which the target content information acquired by the attempted acquisition does not satisfy the predetermined condition, and wherein the processor is configured to output information about a specific portion of the erroneous recording medium, the specific portion being a portion from which the target content information that does not satisfy the predetermined condition has been acquired.

4. The information processing system according to claim 1, wherein the processor is configured to output the information about the erroneous recording medium to the reading device that has read the plurality of recording media.

5. The information processing system according to claim 4, wherein the information about the erroneous recording medium is displayed on the reading device.

6. The information processing system according to claim 4, wherein the processor is configured to output a recording medium image of the erroneous recording medium to the reading device as the information about the erroneous recording medium.

7. The information processing system according to claim 6, wherein the recording medium image is displayed on the reading device.

8. The information processing system according to claim 4, wherein the erroneous recording medium is the recording medium of which the attempted acquisition of the target content information has been unsuccessful, and wherein the reading device displays a screen from which a user can make an input to supplement the target content information of the erroneous recording medium that has not been acquired by the attempted acquisition.

9. The information processing system according to claim 5, wherein the erroneous recording medium is the recording medium of which the target content information acquired by the attempted acquisition does not satisfy the predetermined condition, and wherein the reading device displays a screen from which a user can make an input to supplement the target content information of the erroneous recording medium.

10. The information processing system according to claim 1, wherein a second reading device, different from a first reading device that is the reading device that has read the plurality of recording media is configured to read the erroneous recording medium, and wherein the processor is configured to acquire information obtained by the second reading device reading the erroneous recording medium.

11. The information processing system according to claim 10, wherein the second reading device is a reading device capable of reading at a reading resolution higher than a reading resolution of the first reading device.

12. The information processing system according to claim 1, wherein the processor is configured to output, to a second reading device different from a first reading device that is the reading device that has read the plurality of recording media, the information about the erroneous recording medium.

13. The information processing system according to claim 12, wherein the second reading device is a reading device that is capable of reading at a reading resolution higher than a reading resolution of the first reading device.

14. The information processing system according to claim 12, wherein the erroneous recording medium is the recording medium of which the attempted acquisition of the target content information has been unsuccessful, and wherein the second reading device displays a screen from which a user can make an input to supplement the target content information of the recording medium of which the attempted acquisition of the target content information has been unsuccessful.

15. The information processing system according to claim 12, wherein the erroneous recording medium is the recording medium of which the target content information acquired by the attempted acquisition does not satisfy the predetermined condition, and wherein the reading device displays a screen from which a user can make an input to supplement the target content information of the recording medium of which the target content information acquired by the attempted acquisition does not satisfy the predetermined condition.

16. An information processing system comprising:

means for making an attempt to acquire, from recording medium images obtained by reading a plurality of recording media, target content information recorded on each of the plurality of recording media, means for outputting information about an erroneous recording medium among the plurality of recording media, the erroneous recording medium being (a) a recording medium of which the attempted acquisition of the target content information has been unsuccessful or (b) a recording medium of which the target content information acquired by the attempted acquisition does not satisfy a predetermined condition, wherein the information about the erroneous recording medium is output to a portable terminal means that includes a camera and is different from a reading device that has read the plurality of recording media; and means for displaying a mobile-rescanning button configured to, upon selection, output an instruction to re-scan the erroneous recording medium using the portable terminal means by taking a picture of a portion of the erroneous recording medium.

* * * * *